Dec. 14, 1943.   J. H. S. SKONING   2,336,578
MOLDING EQUIPMENT
Filed July 11, 1940
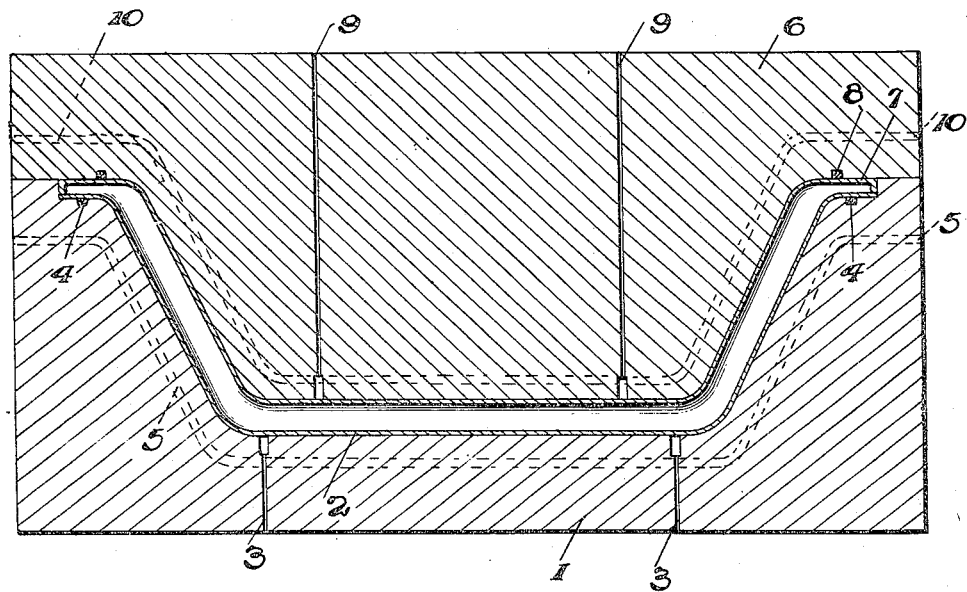
Inventor
John H. S. Skoning
By Raymond J. Norton
Attorney Patented Dec. 14, 1943

2,336,578

UNITED STATES PATENT OFFICE 2,336,578

MOLDING EQUIPMENT

John H. S. Skoning, Central Falls, R. I.

Application July 11, 1940, Serial No. 344,976

1 Claim. (Cl. 18—42)

This invention relates to molding equipment, more particularly to an improved mold for resinous products.

As is known, the mold is one of the most important items of expense in the production of cast thermo-setting and thermo-plastic resins. In order to give a desired accurate shape and high surface finish to a cast resin the mold must be carefully machined and finished. In the past hardened steel and stainless steel have largely been employed as the material for fabricating the mold. These materials are of high initial expense but their use is preferred over cheaper materials because of longer ultimate life and lower maintenance cost. In some circumstances, as where a small production of a particular product is required a soft steel has been employed for the mold. While such a mold is initially cheaper than the hardened or alloy steel it requires frequent polishing and resurfacing and if used for any great production must be discarded and replaced.

At the present time steel molds are generally made by two methods, namely by conventional machine shop methods and by hobbing. Each of these methods is expensive and present their individual drawbacks. In each case relatively soft steel is employed and for most uses the steel, after machining or hobbing must be hardened, case hardening being generally employed for the low carbon steels and an oil quench for the tool steels. Since the formed molds are relatively massive and of uneven or non-symmetrical shape, warping or shrinking may occur during the hardening step. Where the mold shape is complicated special non-shrinking oil hardenable steels are required.

The present invention relates to novel types of molds which combine the advantages of low initial cost of the metal of the mold and optimum physical and chemical characteristics of the molding surface. As will be seen more fully hereinafter, the improved mold of the present invention comprises a composite structure of which the greater mass is made up of relatively cheap, readily formable metal with which is associated a liner or surface of a differential material of different physical characteristics.

In order to more readily explain the underlying principles of the invention a simple physical embodiment of one form is shown in the single figure of the accompanying drawing.

As shown, the mold unit comprises a mold body 1 which is preformed by the simplest method, namely by casting. Associated with the mold member 1 is a conformed liner 2 which is separately formed and which may be made up of any suitable material such as high alloy steel sheet including the stainless steels, such as 18–8, molybdenum 18–8 and similar steels of desirable characteristics. Any suitable means may be employed to hold the liner 2 in the mold body. Such means may comprise rod members 3 which are adapted to be suitably attached to projections on the liner. The liner may be correctly aligned in the mold by means of the liner dowel pins 4. When the mold is adapted to be recurrently heated and cooled the mold body may suitably be cored as at 5 to permit the introduction and circulation of heating and cooling media. Preferably, as shown, the coring conforms in general to the configuration of the liner so as to insure uniform application and abstraction of heat to and from the mold. It will be understood that if desired the mold may be designed for electrical heating.

The upper section or force 6 is similarly constructed. This comprises a casting of the desired mass and mold shape. With this casting is associated the liner 7 of suitable sheet stock which may be assembled on the casting 6 in proper alignment by means of the dowel pins 8 and held in position on the casting by means of the rod 9. Heating and cooling of the mold may be effected by circulating, heating and/or cooling media through the core 10.

In producing the new unit the mold 1 and force 6 may be sand cast of steel or iron of the desired specification and the liner contacting surfaces may be machined to a reasonably smooth surface. The liners 2 and 7 of suitable sheet stock may be formed in a desired shape in any suitable manner as by spinning, drawing, forming on master templates and the like. The molding surface of the liner may be given any desired high surface polish and may be plated to improve surface finish and chemical resistance. The liners after such preforming are then implaced in the castings in the manner described. With this type of assemblage, it will be appreciated that the mold unit comprises a mold body and a liner which is substantially free floating.

It will be observed that with this simple concept of utilizing cast base and a separate liner numerous advantages are secured. Unlike hobbing operations, no expensive hobbing press is required for forming the mold and equally importantly, no limitations are placed on the metal of the mold body. Whereas in hobbing a special grade of tool steel with a high elastic limit and good flow properties is required, in the present method no such limitations are imposed. The mass of the metal which comprises the mold members 1 and 6 be of any suitable ferruginous material. Since these members are cast almost any desired iron or steel analysis may be utilized and no limitations are placed on the tensile properties by reason of excessive machining. As against the earlier methods of machining and hobbing the major forming operations of the present invention is a simple casting step.

The concept of utilizing a separate liner similarly presents marked advantages. As noted, this liner preferably is made of sheet stock. Since it is relatively thin in cross section, and more importantly, since it is substantially uniform in cross section it may be subjected to any desired heat treatment without the danger of warping and shrinking which attends the treatment of units of variable and thick cross sections. The utilization of a relatively thin liner also permits more facile and accurate shaping from sheet stock. With the idea of utilizing a liner for the actual molding surface no limitations are placed on the cost of the material, that is to say, since relatively little metal is used in the liner the best products available can be employed without materially increasing the expense of the entire mold. Furthermore, since the cast structures are the essential stress taking members, the desired surface characteristics of the liner do not have to be compromised with respect to these physical properties.

It will be observed also that under the present invention no reasonable limitations are placed on the size of the molds. Under the present practice definite limitations do obtain. For example, the size of a mold made directly by conventional machining methods is limited by the available size of the steel billet and the means for machining large work. Under the improved method of the invention the only substantial limitations imposed are the size of the sheet stock from which the liner is made; since the mold body itself may be a simple sand casting, there is no essential limitation on the size of the mold base.

It will be understood that with this type of structure the life of the mold is extremely long. If the actual molding surface, i. e. the liners, become marred or worn or if it has to be discarded for any other reason, it is necessary only to replace the liner. Similarly, by utilizing a composite structure of the type described different surface finishes on the molded products may be readily had by substituting differentially-finished liners.

Where the circumstances warrant, a special type of mold may be produced by first forming the liner in the desired shape and then casting an iron or steel backing directly onto the liner. This type of intricate structure, while useful for some purposes, does not present the full advantages of the floating liners described.

It will be understood that while a particular embodiment has been described which comprises a mold base and separate liner of differential ferruginous materials the invention is not limited to the particular modification. When desired the mold base and/or liner may be made of non-ferrous metals, such as brasses, bronzes and the like. The invention is conceived to reside broadly in the concept of utilizing a readily formable backing, such as a metal casting or powder metal compact with a differential thinner and preferably uniform cross sectioned metal sheet or strip to insure more economic and facile mold fabrication and reduced maintenance.

It will be appreciated that the present invention provides many advantages. By invoking the principles of the invention a mold of optimum characteristics may be produced most economically and may be maintained or serviced at minimum cost. The production of such a composite mold with a floating liner permits the utilization of the best materials for the mold body and liner respectively and greatly reduces the mold-forming cost as compared to earlier procedures.

While a preferred embodiment of the invention has been described, it is to be understood that this is given to exemplify the underlying principles involved and not as limiting the invention to the particular embodiment chosen for illustration.

I claim:

A mold for synthetic resinous products comprising two conformed mold bodies of metal casting, each body having a separate liner of rolled alloy steel stock mounted thereon, each such liner being of the floating type and of substantially uniform thickness throughout.

JOHN H. S. SKONING.